Figure 1:
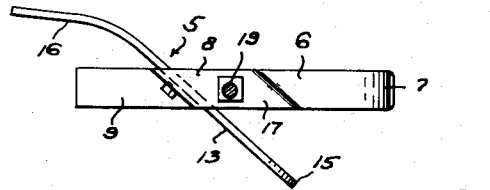

Aug. 30, 1955    K. W. PARKS    2,716,375
PRE-EMERGENCE DRILL CLEANER
Filed Aug. 20, 1954

INVENTOR.
KING W. PARKS,
BY
ATTORNEY.

United States Patent Office 2,716,375
Patented Aug. 30, 1955

2,716,375
PRE-EMERGENCE DRILL CLEANER
King W. Parks, Delray Beach, Fla.

Application August 20, 1954, Serial No. 451,083

4 Claims. (Cl. 97—56)

This invention relates to a pre-emergence drill cleaner and has particular reference to a device for traverse over a crop row after the seeds have been drilled and serves to smooth and pack the dirt upon the seeds and to scrape away and smooth the top area of the crop row to a depth leaving adequate coverage for the seeds.

The device contemplates a novel drill cleaner that may be quickly and easily attached to a conventional agriculture machine whereby the device when used in pairs may be easily and quickly spaced apart a distance corresponding to the drill rows and likewise may be elevated or lowered in accordance with the surface of the crop row to be treated.

Novel features of construction and arrangement of parts will be more clearly apparent during the course of the following description, reference being had to the accompanying drawings wherein has been illustrated a preferred form of the device and wherein like characters of reference are employed to denote like parts throughout the several figures.

Figure 2:
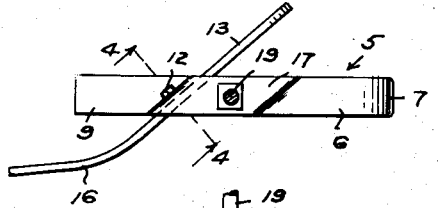
Figures 3, 4:
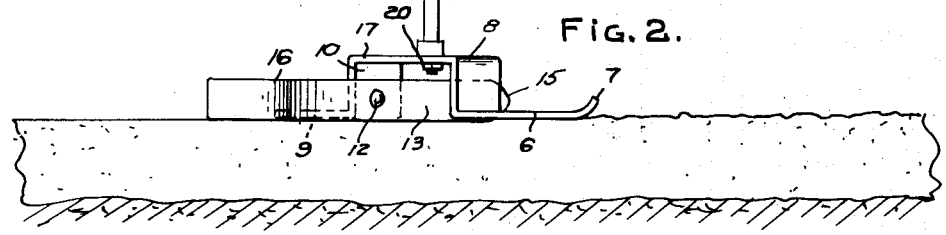
Figure 5:
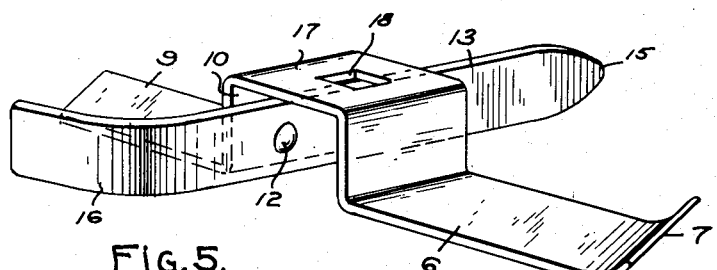

Referring to the drawings:

Figure 1 is a top plan view showing a pair of drill cleaners in spaced apart relation with supporting implement bars being shown in section, Figure 2 is a side elevation thereof, Figure 3 is a front elevation of the device of Figure 1 showing the pair of complemental drill cleaners traversing a hilled crop row, Figure 4 is an enlarged diagonal section taken on line 4—4 of Figure 1, and Figure 5 is a perspective view of one complemental drill cleaner.

Referring specifically to the drawings, the drill cleaners illustrated as a whole by the numeral 5 are made in both right and left forms whereby a pair of such drill cleaners may simultaneously clean a pair of drill rows. Other than being formed in right and left, the drill cleaners are subsequently identical in construction. Each drill cleaner embodies a flat metallic runner 6, the forward end of which is upwardly curved as at 7. Intermediate its ends, the runner 6 has been shaped to provide a diagonally arranged inverted U-shaped portion 8. The trailing end of the runner 6, shown at 9, is parallel to the runner 6 and in the same general plane. The runner 6 and the trailing end 9 thus provide a flat smooth lower surface that rides upon the top of the ground. The rear wall 10 of the U-shaped portion 8 is vertically slotted intermediate its length, as at 11, for the reception of a clamping bolt 12. Extending transversely of the U-shaped portion 8 and adapted to have a flat clamping engagement with the inner surface of the wall 10, is a metallic sweep 13. The sweep 13 embodies a flat elongated plate having a width substantially that of the runner 6 and the sweep 13 is apertured at 14 for reception of the bolt 12, through the medium of which the sweep may be vertically adjusted with respect to the runner. The inner end of the sweep 13 is preferably rounded to a point 15, while its outer end terminates in a rearwardly curved sweep portion 16. Through the medium of the slot 11, the sweep 13 may thus be vertically adjusted so as to be wholly housed within the U-shaped portion 8, or it may be adjusted downwardly whereby its lower marginal edge may project below the flat surface of the runner in accordance with the depth of cut required in removing a pre-determined amount of surface soil from the drill rows. The sweep 13 thus serves to scrape and clean a relatively wide area as it is propelled forwardly in the direction of the arrow, shown in Figure 1, causing such surface soil as is removed to be conveyed to the side of the hill, as in Figure 3.

The flat top portion 17 of the U-shaped portion 8 is apertured at 18 for non-rotatable mounting of the device with respect to an implement holder 19 supported in the usual manner upon the agriculture machine, whereby the drill cleaners may be elevated or lowered as desired. The implement holder 19 may be clamped to the drill cleaner 5 through the aperture 18 and rigidly held thereon in any desirable manner, such as by a clamping nut 20.

In the use of the device after the planting has been accomplished by the usual drill, it becomes desirable at a pre-determined time that the drill rows be smooth and clean and excess soil removed from the drill rows. When this becomes necessary, the operator adjusts the sweeps 13 to the desired depth after which the device is rigidly connected with the implement holders 19 and, when a pair of drill cleaners are employed as in Figures 1 and 3, the implement holders and their supported drill cleaners 5 are adjusted laterally in accordance with the drill rows. The operator then after lowering the implement holder to the point where the runners contact the surface of the crop hill, proceeds to move his machine forwardly following the drill rows and through the medium of the sweeps 13, scrape the excess soil from above the seeds and shoves it laterally to the opposite sides of the hill. The runners 6 and 9 tend to smooth and pack the dirt closely upon the seed. Vertical adjustment of the sweeps 13 result in a removal of only such excess soil as is desired and in accordance with the depth at which the seed have been planted, taking into consideration the normal time of germination. The device is strong, durable, cheap to manufacture and is highly effective for the purposes set forth and results in a very considerable saving of labor and a very considerable increase in the subsequent crops.

It will be apparent from the foregoing that a very effective drill cleaner has been provided that is readily attachable to conventional agriculture machines commonly employed as cultivators or the like. The device has no parts that will be likely to become dis-arranged and the sweeps 13 may be replaced by other similar sweeps of varying lengths. The upwardly curved end 7 of the runners serves to over-ride and crush any large particles of earth and the device as a whole results in a smooth, even surface to the drill rows. It is to be understood that while a preferred form of the device has been here illustrated and described, changes are contemplated as readily fall within the spirit of the invention as determined by the scope of the subjoined claims.

Having described my invention, what I claim as new and desire to secure by Letters Patent is:

1. A pre-emergence drill cleaner for use with an agriculture machine having an implement bar and whereby the drill cleaner is conveyed along a drill row for conditioning the surface soil in said drill row, comprising a flat runner that is detachably connected with the said implement bar, the runner being bent intermediate its ends to provide a downwardly opening transverse socket, a sweep device disposed in the socket and having its ends extending to opposite sides of the runner, the sweep device being adjustable vertically in the socket whereby its lower edge may be adjusted to a point below the lower surface of the runner.

2. The device according to claim 1, wherein the socket is of inverted U-shape and with the socket being acutely angled transversely of the runner, the sweep being adjustably disposed upon a rear wall of the socket and with the sweep being angled longitudinally in accordance with the angle of the socket, the socket having a flat upper wall that is apertured for detachable connection with the implement bar.

3. A pre-emergence drill row cleaner for conditioning the soil surface over and to opposite sides of a drill row, comprising a flat elongated runner having its forward end upwardly curved, the runner intermediate its ends being shaped to provide an upstanding inverted U-shaped transverse socket, the socket being downwardly opening and acutely angled with respect to the runner, the socket having a flat upper wall that is apertured for detachable connection with an implement bar carried by an agriculture draft device whereby the drill cleaner may be conducted in a line parallel with the drill row, a sweep device comprising an elongated flat bar that is straight for its major length and with the sweep being disposed in the socket with its flat surface at a right angle to the surface of the runner, the sweep being disposed with a lower scraping edge in a horizontal plane, the sweep being vertically supported and adjusted within the socket and with its opposite ends projecting to opposite sides of the runner, the sweep having a forward leading end that is rounded and an opposite end that is rearwardly curved, adjustable means between the socket and the sweep whereby a lower scraping edge of the sweep may be adjustable to a point below the lower surface of the runner, the sweep being of a length to extend to a predetermined point to opposite sides of the drill row.

4. The device according to claim 3, wherein a rear flat wall of the socket is provided with a vertically arranged elongated opening, an aperture formed in the sweep intermediate its ends and a clamping bolt extending through the aperture and the elongated opening of the socket wall whereby the sweep may be clamped in adjusted scraping position.

References Cited in the file of this patent

UNITED STATES PATENTS

| | | |
|---|---|---|
| 823,951 | Lohrke | June 19, 1906 |
| 1,053,426 | Morris | Feb. 18, 1913 |
| 1,366,915 | Knorr | Feb. 1, 1921 |
| 1,763,271 | Speck | June 10, 1930 |